US012343932B2

(12) United States Patent
Susnjara et al.

(10) Patent No.: US 12,343,932 B2
(45) Date of Patent: Jul. 1, 2025

(54) METHODS AND SYSTEMS FOR CREATING STRUCTURES FROM CUT PARTS

(71) Applicant: Thermwood Corporation, Dale, IN (US)

(72) Inventors: Kenneth J. Susnjara, Birdseye, IN (US); Jody W. Wilmes, Owensboro, KY (US); Lawrence S. Epplin, Grandview, IN (US)

(73) Assignee: Thermwood Corporation, Dale, IN (US)

( * ) Notice: Subject to any disclaimer, the term of this patent is extended or adjusted under 35 U.S.C. 154(b) by 0 days.

(21) Appl. No.: 18/352,875

(22) Filed: Jul. 14, 2023

(65) Prior Publication Data
US 2025/0018643 A1 Jan. 16, 2025

(51) Int. Cl.
B29C 64/147 (2017.01)
B29C 64/393 (2017.01)
B33Y 10/00 (2015.01)
B33Y 50/02 (2015.01)

(52) U.S. Cl.
CPC .......... B29C 64/147 (2017.08); B29C 64/393 (2017.08); B33Y 10/00 (2014.12); B33Y 50/02 (2014.12)

(58) Field of Classification Search
CPC ... B29C 64/386; B29C 64/393; B29C 64/188; B29C 64/194; B33Y 50/00; B33Y 50/02
See application file for complete search history.

(56) References Cited

U.S. PATENT DOCUMENTS

| 5,031,483 A | 7/1991 | Weaver |
| 6,627,835 B1 | 9/2003 | Chung et al. |
| 8,987,636 B2 | 3/2015 | Fagan |
| 11,345,081 B1 | 5/2022 | Susnjara |
| 11,561,528 B2 | 1/2023 | Trounson, III |
| 2012/0089246 A1* | 4/2012 | Mitani ............... G05B 19/4097 700/159 |
| 2016/0332369 A1* | 11/2016 | Shah .................... G05B 19/188 |
| 2021/0101343 A1* | 4/2021 | Susnjara ................ B33Y 30/00 |

FOREIGN PATENT DOCUMENTS

EP 3659806 B1 * 3/2023 ............. B23P 23/04

OTHER PUBLICATIONS

International Search Report and Written Opinion issued in International Application No. PCT/US2024/037203, mailed Oct. 30, 2024.

* cited by examiner

Primary Examiner — Philip C Tucker
Assistant Examiner — Jimmy R Smith, Jr.
(74) Attorney, Agent, or Firm — Bookoff McAndrews, PLLC

(57) ABSTRACT

An additive manufacturing method includes receiving an electronic representation of a part with a control system, determining a plurality of layers for the electronic representation of the part, and separating one or more of the layers associated with the electronic representation of the part into a plurality of segments. The additive manufacturing method further includes adding a joint structure to two or more of the segments and generating instructions for controlling a machining apparatus based on the electronic representation of the part, the layers, the segments, and the joint structure.

10 Claims, 4 Drawing Sheets

METHODS AND SYSTEMS FOR CREATING STRUCTURES FROM CUT PARTS

TECHNICAL FIELD

Aspects of the present disclosure relate to systems and methods for fabricating components. In some instances, aspects of the present disclosure relate to methods and systems for fabricating components (such as, e.g., patterns, molds, and similar products, etc.) via techniques or processes that have similarities with 3D printing processes involving layering. These techniques or processes may enable, in at least some embodiments, production of lower-cost molds or tooling without the use of a 3D printer.

BACKGROUND

Additive manufacturing techniques and processes generally involve the buildup of one or more materials to make a net or near net shape (NNS) object, in contrast to subtractive manufacturing methods. Although "additive manufacturing" is an industry standard term (ASTM F2792), additive manufacturing encompasses various manufacturing and prototyping techniques known under a variety of names, including freeform fabrication, 3D printing, rapid prototyping/tooling, etc.

Some additive manufacturing techniques use large-scale 3D printers that are capable of fabricating very large parts. These parts can be produced from fiber-reinforced thermoplastic materials, for example. One method of producing these parts utilizes a polymer extruder which generates a bead of molten thermoplastic material, beads of material being added in sequence to that the part is produced one layer at a time. These layers can be modified and or flattened into wider beads during this additive process using devices such as tamping plates, rollers, or the like. Using these approaches, sometimes referred to as 3D printing, the part is made slightly larger than desired. After the part cools and hardens, it is machined to the final size and shape. The resulting part is generally a shell of a specific thickness and of the approximate size and shape desired.

A different type of additive manufacturing can be referred to as "cut layer" additive manufacturing. In some examples of cut layer additive manufacturing, pieces can be cut from porous material, stacked on top of one another, and attached together to create a part. In some cases, this part may be hollow, comprised of individual parts that are narrow beads that, when stacked together, create a shell or wall around the outside shape of the desired part. In some approaches, a shell or wall is built from a porous material and infused with a catalyzed thermoset liquid. The liquid cures to produce a rigid composite part reinforced with the porous material.

There are times, however, when it is desirable to produce a part from non-porous material such as metal (e.g., aluminum). Examples of potential applications for such a part include industrial molds and tooling, such as thermoforming molds, compression molds, and injection molds. In general, aluminum molds for applications such as compression or injection molds are not suitable for long-term production but can be desirable for prototyping and short run sample production, provided that the aluminum molds have a suitable cost and can be produced in an appropriate period of time.

Additive processes can be utilized to produce parts by cutting or machining materials such as wood or metal. These materials can be formed into walls of a desired width and thickness and in the size and shape desired for each layer of a part. The layers can then be permanently attached to each other to build up a final near-net shape structure. A relatively efficient method for producing parts by these processes includes separating a wall that defines each layer into two or more layer sections and then nesting the resulting sections on sheets of material.

For at least some parts, the programming to design and then program all layer segments for a large additive product can have disadvantages or negative impacts on the production of the part. For example, the resources associated with this programming for at least some parts can even be prohibitive in terms of cost and time required to complete programming and associated efforts.

SUMMARY

In some aspects, it may be beneficial for layer segments to include a means for reconnecting separate segments together during the assembly process to create complete layers. In some embodiments, this attachment means is in the form of geometry machined into the end or ends of each segment, such as the joint structure similar to structures that hold parts of a jig saw puzzle together, or a means to utilize mechanical attachment such as bolts, rivets, clips, or the like. In some aspects, it is beneficial to provide drilled and/or tapped holes to allow layers themselves to be bolted or otherwise fastened together.

In some aspects, it is beneficial that machined layer segments include a means, such as dowel and/or bolt holes, to help align individual layers accurately with each other during the assembly process.

In some aspects, it may be beneficial to use identification, such as a print directly on the part, or other means of identifying the part. This identification may be monolithically formed with or affixed to one or more segments of the part to assist in identifying the part or the segment during assembly.

In some aspects, the part may include aluminum or another non-porous metal and be in the form of tooling, a mold, or similar device. For these and other parts, it may be beneficial to machine an opening in two or more adjacent layers which connect in such a way as to create channels in walls of the part. These channels may enable circulation of a liquid to heat and/or cool the assembled part. This may be beneficial for parts in in which the final application benefits from temperature control.

These and other embodiments may involve a "Computer Numerical Control" (CNC) machining program. The CNC machining program may be generated for each layer segment, to cut out the part with a desired shape and provide other desirable features, including the features identified above and/or described below.

Programming parts such as tooling or molds can, in some aspects, be accomplished using software such as so-called "ComputerAided Design/ComputerAided Manufacturing" (CAD/CAM) software of a manufacturing system. The "Computer Aided Design" (CAD) portion of such a system may be used to design the part, including some or all geometric features, while the "Computer Aided Manufacturing" (CAM) portion may determine what machine motions are necessary to machine the part. Additional software, such as a "Post Processor" may create CNC program code to cause one or more machine tools to execute desired motions and produce the part.

These programming functions can be performed for every part that needs to be machined. Further, if there are multiple parts that will be machined from sheet stock, additional specialized software can be utilized to nest these parts on the sheet material in such a manner as to maximize yield and minimize scrap. This may reduce waste and material costs, as well as reduce the amount of time needed to produce a series of segments.

However, in some aspects, performing these programming functions can involve significant time and effort by a programmer, as the programmer could be involved in generating a program or other set of electronic instructions for each individual segment or layer. A large additive product may consist of hundreds or even thousands of individual parts or layer segments, each of which being designed, and a CNC program generated, to perform machining.

Aspects of the present disclosure relate to, among other things, methods and apparatus for fabricating components via layering techniques. Each of the aspects disclosed herein may include one or more of the features described in connection with any of the other disclosed aspects. Some embodiments of the disclosure relate to a software system that is tailored to program one or more of: the type of product desired, features of that specific type of product, or the steps necessary to program that type of product. These and other embodiments may reduce the programming burden and enable efficient production of a part from a plurality of individual segments.

The disclosed software or other programming or automation can, in at least some embodiments, perform the disclosed functions in an automated manner that is faster and with less effort as compared to individually programming layers or segments. In at least some embodiments, a user with only basic understanding of the fundamentals of the product type can produce an additively-manufactured part. Such a user may also be able to communicate the specific size and shape of the particular product desired to the software or control system.

The size, shape, and/or other information may be communicated to the software or programming of a control system by supplying the control system with a CAD file which defines at least the specific outer surface of the part desired. Additional information about the material being used and desired configuration of the final product can be input through interactive communications with the software.

In one aspect, an additive manufacturing method may include receiving an electronic representation of a part with a control system, determining a plurality of layers for the electronic representation of the part, and separating one or more of the layers associated with the electronic representation of the part into a plurality of segments. The additive manufacturing method may further include adding a joint structure to two or more of the segments and generating instructions for controlling a machining apparatus based on the electronic representation of the part, the layers, the segments, and the joint structure.

In another aspect, an additive manufacturing method performed with a manufacturing system may include storing an electronic representation of a part in a memory associated with a control system, the control system being configured to control the manufacturing system, including causing one or more machining tools of the manufacturing system to remove material and separating one or more of the layers associated with the electronic representation of the part into a plurality of segments based on a response to one or more prompts issued with the control system. The additive manufacturing method may further include adding a joint structure to two or more of the segments with the control system and removing material from one or more sheets of material with the manufacturing system to form the segments and the joint structure.

BRIEF DESCRIPTION OF THE DRAWINGS

The accompanying drawings, which are incorporated in and constitute a part of this specification, illustrate exemplary aspects of the present disclosure and together with the description, serve to explain the principles of the disclosure.

DETAILED DESCRIPTION

The present disclosure is drawn to, among other things, methods and systems for fabricating components via layering techniques. In particular, the methods and systems described herein may include a software system that is configured to program: the type of product desired (e.g., as specified via user input(s)), features of a specified product or type of product, and/or the steps to produce the specified product or type of product.

The functions described herein, including functions for forming cut layers, may be useful to create a part, including parts described in U.S. Nonprovisional patent application Ser. No. 18/315,907, filed on May 11, 2023, the entirety of which is incorporated by reference herein.

Figure 1:
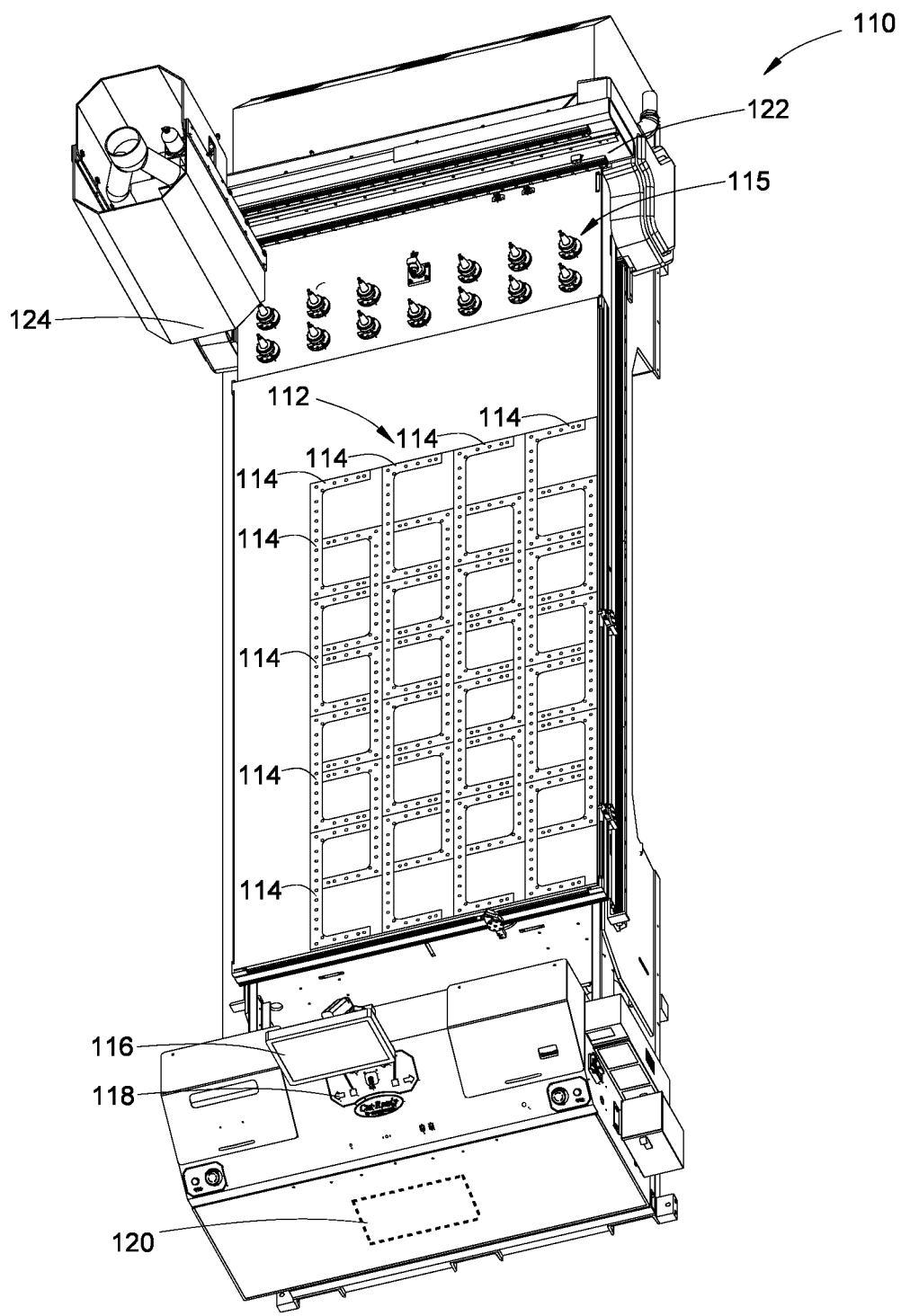
FIG. 1 is a perspective view of an exemplary control system and material cutting machine operable to form a plurality of layer segments of a part, according to aspects of the present disclosure.

FIG. 1 illustrates a manufacturing system 110 for making various types of parts, including the types of parts described in U.S. Nonprovisional patent application Ser. No. 18/315, 907, molds, tooling, and others. Manufacturing system 110 may include a machining apparatus, such as a CNC router. Manufacturing system 110 may include a plurality of machining tools 115, input devices such as display 116 and physical buttons 118, and a control system or controller 120.

Machining tools 115 may include cutting bits with different sizes (e.g., tip diameters) and shapes. Each machining tool may be connectable to a tool holder 124, by a manual or automatic tool-changing process. Tool holder 124 may be movable in at least three degrees of freedom to control the position a machining tool 115. Tool holder 124 may move vertically, along a first horizontal direction by sliding across a gantry 122, and along a second horizontal direction by translating together with gantry 122.

Display 116 may be an input device, such as a touchscreen, that receives inputs (e.g., selections) from an operator. Physical actuators 118 (e.g., buttons, switches, etc.) may form additional input devices that enable operators to generate inputs, function as an emergency stop, and/or function as a start switch. In some embodiments, a keyboard, mouse, buttons, or other additional physical actuator 118 may be used to provide one or more alternative or additional input devices.

Figure 2:
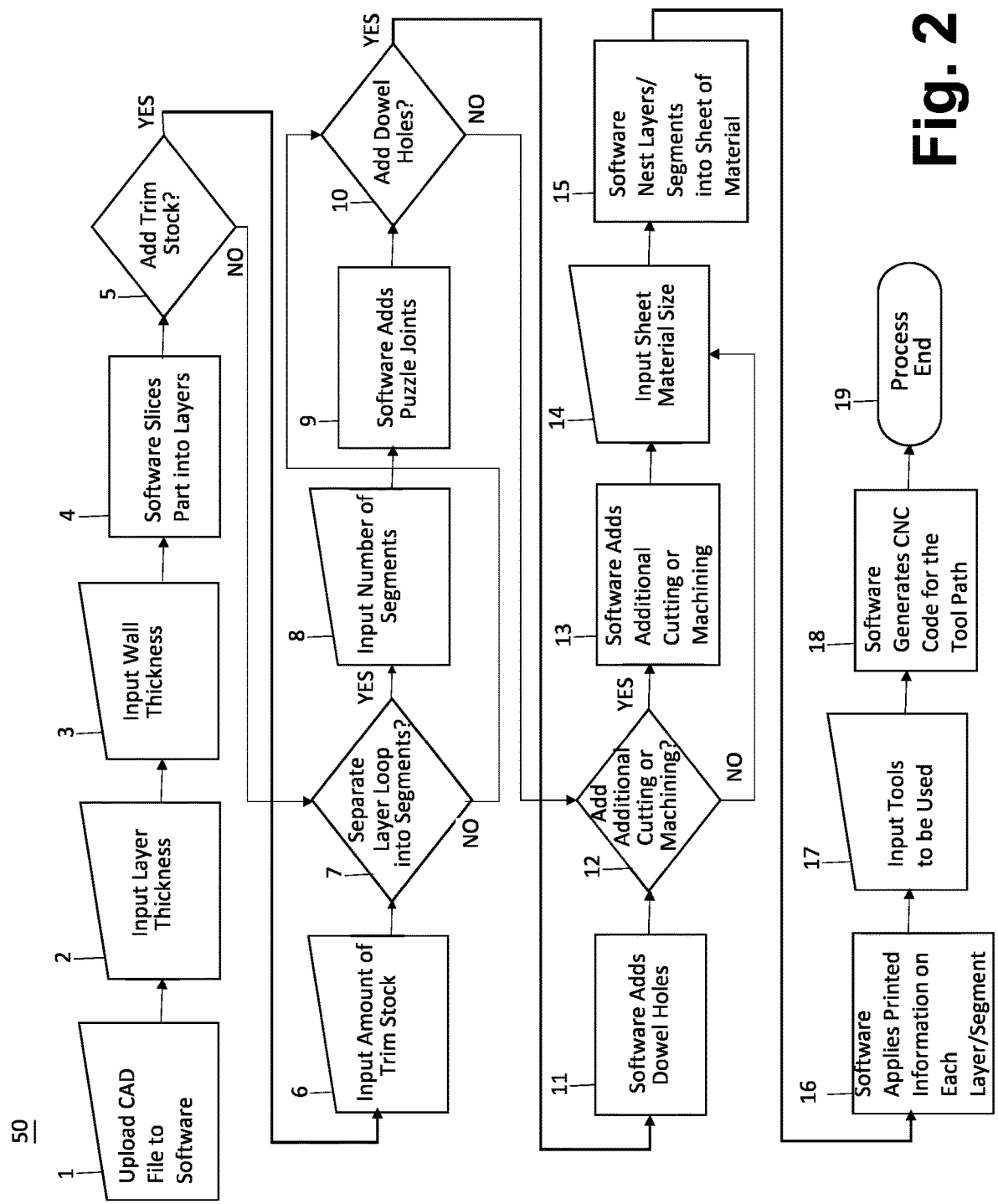
FIG. 2 is a flow chart of a method for manufacturing a part, according to aspects of the present disclosure.

Controller 120 may include circuitry, including one or more processors, storage devices, memory, etc. The memory may store instructions that, when executed by one or more processors, cause manufacturing system 110 to produce one or more cut layers and/or perform any of the functions described herein, including the functions described with respect to an additive manufacturing method 50 (FIG. 2). The memory may also store one or more electronic representations of a part, allowing a user to select a desired part by interacting with the input devices of system 110. This may avoid the need to design or upload an electronic representation of a part to controller 120.

Controller 120 may be configured to receive inputs from display 116 and/or physical actuators 118. Controller 120 may also control display 116, as well as generate commands to motors for moving tool holder 124 and gantry 122. While one controller 120 is shown in FIG. 1, as understood, multiple control systems or devices (e.g., computing systems, cell phones, laptop computer, etc.) may individually or collectively perform the functions of controller 120.

A table or other surface of manufacturing system 110 may be configured to receive a sheet of material 112. Each sheet of material 112 may be machined or routed with one or more tools 115 to form individual layer sections or segments 114. While the shape of segments 114 shown in FIG. 1 may be used to construct a mold, manufacturing system 110 is configured to produce a plurality of different parts.

Segments 114 may be nested with each other on a sheet of material 112 as shown in FIG. 1. Nesting segments 114 in one or more individual sheets of material 112 may provide an improved yield and reduce waste and cost. Some individual segments 114 may have different shapes, while at least some segments 114 have the same shape. Each segment 114 may form an entire layer of the final part, or a portion of a particular layer of part, as described below. While an entire part may be formed from a single sheet of material 112, a plurality of sheets 112 of material may be used to form a single part.

Figure 3:
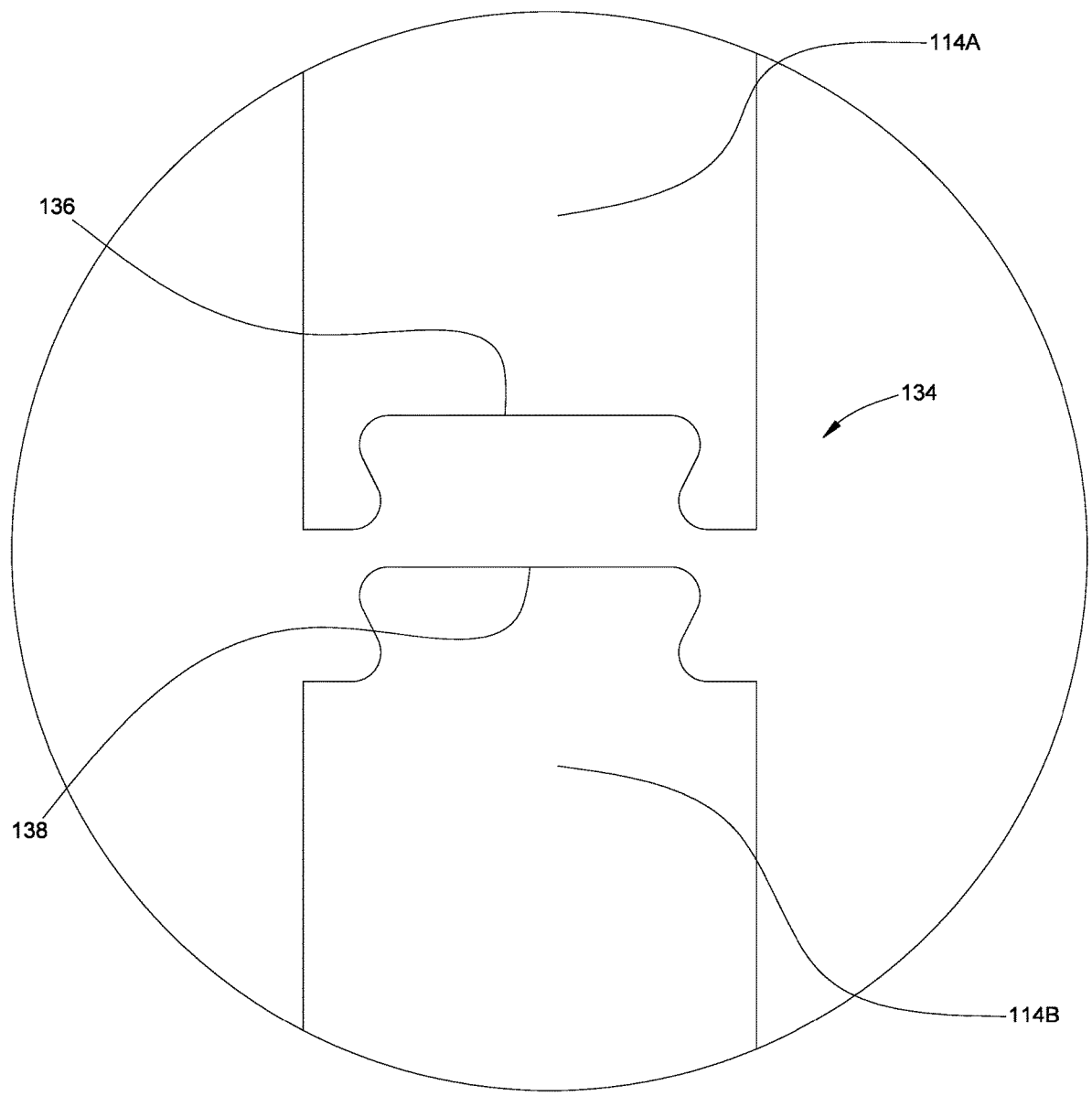
FIG. 3 is a view of an exemplary joint, according to aspects of the present disclosure.
Figure 4:
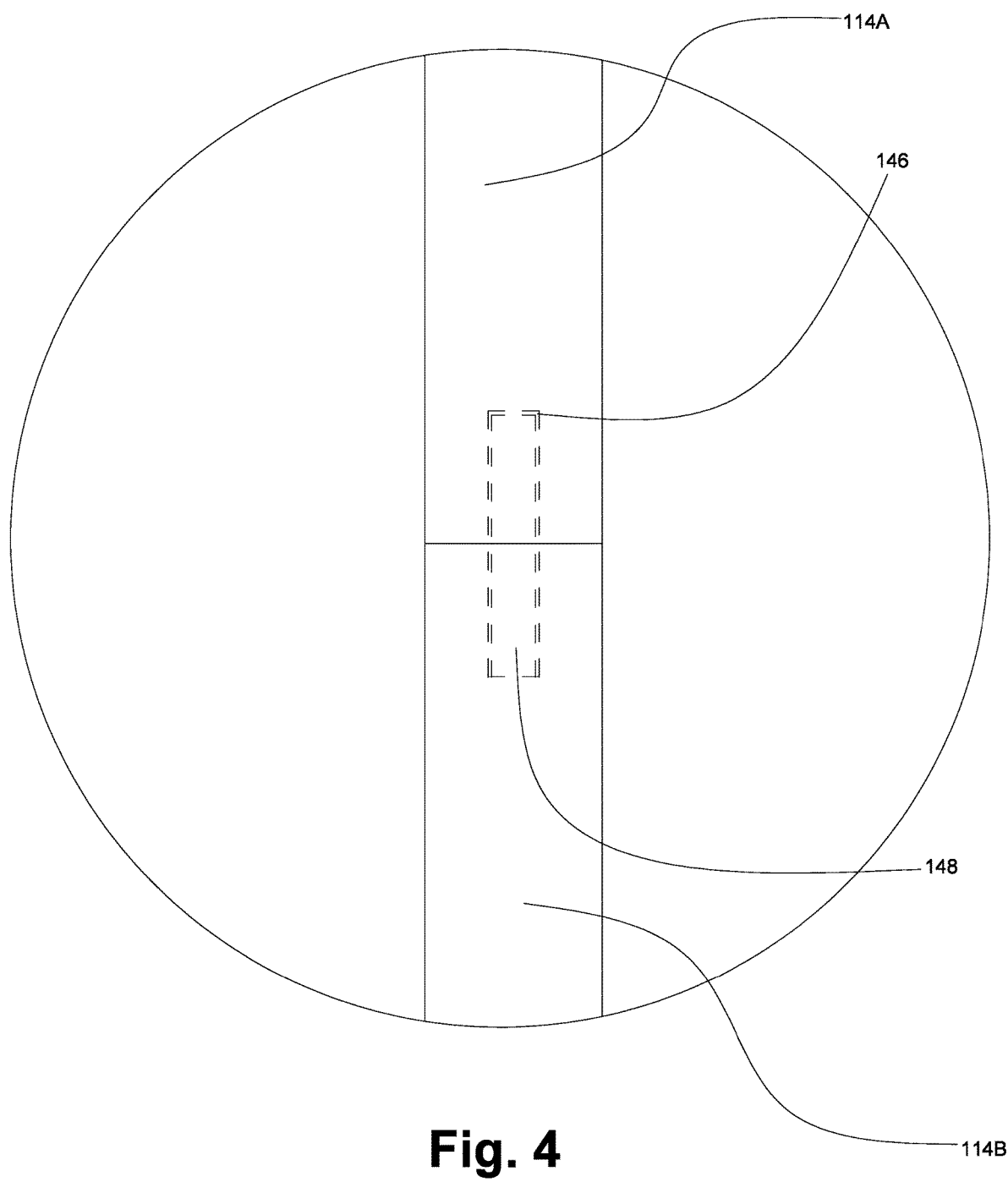
FIG. 4 is a view of another exemplary joint, according to aspects of the present disclosure.

FIG. 2 is a flowchart illustrating a series of steps of a method 50 for producing a part. FIGS. 3 and 4, which as described in conjunction with FIG. 2, illustrate exemplary joints, one or both of which may be formed with system 110 as part of method 50 for use in a part.

A step 1 of method 50 may include uploading, opening, or otherwise providing an electronic model or other electronic representation of a part, such as a CAD file, to controller 120. Step 1 may include uploading a CAD file to a computing system that is part of system 110 or outside of system 110 (e.g., controller 120). This system, whether controller 120 itself or another system, may include software for generating code that, when executed, controls a tool (e.g., tool holder 124 and plurality of machining tools 115) for forming a portion or entirety of the part.

In some aspects, the CAD file or other electronic representation of the part used in step 1 defines at least the outer surface of the part. When the electronic representation defines only the outer surface of the part, additional aspects of the part may be determined, for example, by performing one or more of steps 2-16 below. If desired, the file may include information related to the interior of the part. Step 1 may also include generating and/or uploading additional information, including the material used and desired configuration of the final product. Step 1 may be performed, entirely or in part, by inputs generated according to interactive communications with the software.

A step 2 may include automatically or manually inputting a layer thickness (e.g., a thickness in direction orthogonal to a plane defined by sheet of material 112 in FIG. 1). This input may be received by controller 120 by display 116, physical actuators 118, another (e.g., separate or remote) computing system, cellular phone, etc. In the example of manual input, a user specifies the thickness of the material (e.g., the thickness of material 112) that will be machined with the CNC system to make individual layers. In other examples, the thickness of the layer may be known (e.g., predetermined). In some examples, the thickness may be measured with a sensor, such as a displacement sensor, laser sensor, or others.

Step 2 may include inputting this thickness, whether manually or automatically determined, to the software or other programming system. In embodiments where the thickness of the material is known (e.g., predetermined) or measured with a sensor, step 2 may be performed without the intervention of a user. When the thickness of the material is known to the user or measured with a sensor that is not in communication with controller 120, the user may manually input the thickness by interacting with one or more of the above-described input devices of manufacturing system 110. In some aspects, the thickness input in step 2 may be equal to or less than the thickness of the sheet of material 112.

Step 2 of method 50 may include creating an additive layer from each slice, these slices being layers defined by layers of the part that are determined based on the layer thickness. In at least some embodiments, the thickness of the layers may be less than the thickness of the sheet of material 112. However, the thickness of the sheet of material 112 may be approximately equivalent to the layer thickness to reduce the amount of material removed from the sheet of material 112. These layers may have an outside shape that corresponds to the outer perimeter of the sliced layer, with an inner shape that is offset by a distance that corresponds to a wall thickness.

A step 3 of method 50 may include specifying the wall thickness (e.g., a thickness of material as measured in a direction that is orthogonal to the direction of the layer thickness specified in step 2, such as a lateral direction in FIG. 1, 3, or 4). In some aspects, step 3 may include receiving a user-inputted wall thickness for the final part. This thickness may be received via the input device(s) described above. In some aspects, inputting the wall thickness may tend to result in each layer becoming a loop (e.g., an open shape or a closed shape) of a specific width.

In method 50, a step 4 may include slicing the part into individual layers. For example, software of controller 120 may generate layers based on the file uploaded in step 1, the layer thickness received in step 2, and the wall thickness received in step 3.

Optionally, method 50 may include adding trim stock. For example, a step 5 may include determining whether it is desirable to add trim stock for the part. This determination may be made by prompting a user (e.g., via a prompt on display 116) with a request to add trim stock. Alternatively, controller 120 may determine whether it is desirable to add trim stock automatically.

When the addition of trim stock is desired, a step 6 may be performed. Step 6 may include determining the amount (e.g., thickness) of trim stock that will be added. This amount may represent an additional thickness for the final assembled part. This thickness may expand the size of the part slightly and may tend to increase the number of sheets of material 112 used to produce the part.

A step 7 may be performed after adding trim stock, or after creating a plurality of layers in step 4 if no trim stock was added. Step 7 may include separating each layer into two or more segments (e.g., the U-shaped segments 114 shown in FIG. 1, ends of which are shown in FIGS. 3 and 4). Prior to step 7, each layer may have a closed shape, forming a loop. When one or more layers has a closed shape and is formed by a single segment, the single segment may have a closed shape. However, when it is desirable to separate the loop into segments, the result may be segments 114 (FIG. 1) that have an open shape. In some aspects, the creation of segments may be directed by the user. For example, controller 120 may prompt the user via display 116 with a request to separate one or more layers into segments.

For example, in step 8, controller 120 may prompt a user to input a desired number of segments. This number may be propagated to each layer, specified for a single layer, or specified for a group of layers. The number of segments may include, for example, 2, 3, 4, 5, 6, 7, 8, 9, 10, or more segments. In the example illustrated in FIGS. 3 and 4 at least two segments 114A and 114B are used, the segments 114A and 114B being connected to each other at a joint structure (also referred to herein as simply a "joint"), as described below. If desired, the number of segments may be determined by controller 120 based on, for example, the perimeter of the layer, the layer thickness specified in step 2, the wall thickness specified in step 3, and/or other considerations. In some embodiments, the creation of layer segments 114 may be beneficial, allowing for efficient nesting of segments in sheets of material 112 from which the layer will be cut.

When one or more layers include a plurality of segments, a step 9 may be performed. Step 9 may include modifying each layer with controller 120 to include a joint at the interface of two segments. Exemplary joints are shown in FIGS. 3 and 4, forming connections between an end of segment 114A that faces and abuts an opposite end of segment 114B.

For example, as shown in FIG. 3, software of controller 120 may cause the addition of a joint 134 formed with shape (e.g., of additional material) such as a protrusion 138 and/or one or more cuts forming a recess 136 to the ends of individual segments 114A and 114B, which may collectively form a layer. Considering two segments 114A, 114B (FIG. 3) intended to be placed together on a layer, the shape of material removed from one segment may have the same shape, or approximately the same shape, as the material added to the other segment. In particular, in the example shown in FIG. 3, protrusion 138 may have a widened head connected to a body of segment 114B by a narrowed neck. Recess 136 may form an opening with a widened head and a narrowed neck, allowing recess 136 to receive protrusion 138.

In some embodiments, including the embodiment shown in FIG. 3, joints 134 may have shapes that are analogous to those that hold parts of a jigsaw puzzle together. These shapes, or other shapes, may be automatically generated by controller 120, without the need to manually design or otherwise generate of the geometry of the joint. Joints 134 may allow separated segments of each layer to be reassembled into a complete layer after they are nested in a sheet of material 112, cut, and removed from the same sheet of material 112.

A step 10 of method 50 may include forming one or more holes 146 (FIG. 4) to receive connectors 148, such as dowels, in two or more layers. Step 10 may be directed (e.g., manually) by the user if desired, by interacting with display 116. For example, a user may interact with an input device, such as display 116, and request the addition of one or more holes 146 to segments 114A, 114B created in step 8. If desired, and in a manner similar to the above-described steps, step 10 may be performed automatically by controller 120. In particular, step 10 may determine whether dowel holes should be added without the need to prompt a user.

In step 11, software or other programming of controller 120 may add one or more holes 146 to pairs (or three, four or more) of segments 114 in the electronic representation of the part to accommodate connectors, such as dowels 148, in the segments 114 produced with system 110. These connectors may be useful to help align two or more layers during the assembly process.

In some aspects, dowel holes 146 may be formed without the user specifying the location and number of these holes. Rather, controller 120 may determine, based on the geometry of each layer, the number of dowel holes 146 and appropriate spacing of holes 146. If desired, controller 120 may automatically generate hole numbers, distribution, and location, and request confirmation by the user. While such confirmation is not required, in some embodiments, the user may guide controller 120 to determine the number and placement of holes 146 by specifying where holes 146 should be present. For example, the user may specify a general location (e.g., an end face) of a segment 114A, 114B in which a hole 146 or a dowel 148 is desired, and controller 120 may determine the precise spacing, location, etc., and automatically generate an aligned dowel hole on a second segment 114A, 114B. The above-described aspects may, in at least some embodiments, reduce the programming burden associated with use of system 110.

A step 12 of method 50 may include determining whether additional cutting and/or machining operations are desired. This determination may be made in an automatic manner by controller 120, or may be directed by a user. When this determination is negative, method 50 may proceed to step 14, described below.

When the determination in step 12 is affirmative and additional cutting or machining is desired, a step 13 may be performed in which controller 120 may add cutting or machining operations to facilitate. During this process, a user may communicate to the software or other programming of controller 120 (e.g., via inputs to display 116 and/or actuators 118) one or more desired functions. In response to these inputs, controller 120 may automatically add these functions to the design for the part. For example, controller 120 may automatically generate planar cuts, angled cuts (e.g., chamfers), reductions in thickness, recessed surfaces, and others. In some aspects, step 13 may include adding cooling and/or heating channels within a plurality of different layers. This may be beneficial when producing parts that benefit from liquid cooling or liquid heating, such as molds.

As the functions described with respect to steps 11 and 12 may affect more than one layer or more than one segment, they may be automatically generated in a plurality of layers and/or segments in response to a user's interaction for a single layer, a single segment, or the part as whole. As an example, a user may interact with display 116 to request a single cut, machined surface, and/or coolant channels, resulting in controller 120 modifying the design of the part of each layer that overlaps with this cut or machining.

A step 14 may include inputting the dimensions or size of the sheet of material 112. These dimensions may include, for example, the length and width of the sheet of material 112. Similar to the thickness described in step 2, these dimensions may be input manually by a user, or determined by controller 120 based on predetermined information and/or information received from one or more sensors associated with manufacturing system 110.

The size or dimensions of the sheet of material 112 (e.g., length, width and/or thickness) may be an example of a characteristic of the sheet of material 112 that is selected with controller 120. In some aspects, the characteristic of the sheet of material may include the type of material 112 from which the sheet is formed (e.g., a metallic material, fiberboard material, porous material, nonporous material, a hardness of the material, etc.).

Once each layer has been processed (e.g., as described in the preceding steps of method 50) and the size of the sheet of material 112 input, controller 120 may proceed to determine positions for layer segments 114, resulting in nesting of layer segments 114 as shown in FIG. 1. These segments may be nested, for example, on an area that corresponds to the overall size of the sheet of material 112.

A step 16 may include creating a path to direct a print head (not shown) to move and apply printed information on each segment. This information may identify a particular the layer or location that corresponds to the segment. In particular, the information may identify a specific layer and a particular position on that layer. Additional information may be printed in step 16, including encoded information. Encoded information may be provided in the form of a one-dimensional or two-dimensional bar code or other machine-readable or human-readable marking that identifies the specific segment, to aid in production of a replacement, if necessary. As understood, step 16 is an optional step of method 50. In some embodiments, step 16 may be performed in response to a request from a user interacting with input devices for manufacturing system 110.

It may be desirable for controller 120 to operate using a particular machining tool 115 or plurality of machining tools 115. A step 17 may include specifying one or more particular tools 115 via display 116 and/or actuators 118. In response to receiving a request for use of one or more particular tools 115, controller 120 may generate CNC code that, when executed, causes the machine to perform functions associated with that tool 115. Using this information, the software or other programming may cause controller 120 to develop a CNC program to cause one or more tools 115, gantry 122, and **124 to move according to steps 1-17. For example, controller 120 may perform a step 18 that includes creating a tool path that defines machine motions to process each segment 114 on each sheet 112 of material on which segments 114 are located. Step 18 may also include generating machine functions which should occur along the tool path. At the conclusion of step 18, software calculations for controller 120 may end at a step 19 and CNC machining center of manufacturing system 110 may perform the process of removing material to create segments 114.

Exemplary advantages of one or more aspects of the present disclosure is that the user does not need to develop and design, or program, any particular segment or any particular layer. Instead, a user may simply define the final product desired by interacting with display 116 and/or actuators 118. If desired, one or more manual operations may be performed, as described above. However, in at least some embodiments, some or all of these steps may be automated (e.g., performed by controller 120) in response to a user's selection of a part for production. Defining or specifying only the final product may involve significantly less effort than programming hundreds or even thousands of individual segments and/or layers that function together in a final product.

There are numerous advantages to producing parts, such as industrial tools, molds, and patterns, using non-printable material, as described above. Such advantages include, for example, low material cost, lower investment in production equipment, fast production speed, and ability to assemble and produce parts with internal cooling paths or other desirable internal features. These advantages may be realized in conjunction with an advantageous method for producing a CNC program, such as the above-described methods.

From the foregoing detailed description, it will be evident that there are a number of changes, adaptations and modifications of the present disclosure which come within the province of those persons having ordinary skill in the art to which the aforementioned disclosure pertains. However, it is intended that all such variations not departing from the spirit of the disclosure be considered as within the scope thereof as limited by the appended claims.

What is claimed is:

1. An additive manufacturing method performed with a manufacturing system, the method comprising:
    storing an electronic representation of a part in a memory associated with a control system, the control system being configured to control the manufacturing system, including causing the manufacturing system to remove material;
    receiving, a request for coolant channels;
    dividing one or more layers associated with the electronic representation of the part into a plurality of segments based on a response to one or more prompts issued with the control system;
    adding a joint structure to two or more of the segments with the control system; and
    removing material from one or more sheets of material with the manufacturing system to form the segments by movement of a tool holder, a gantry, and a tool of the manufacturing system and based on the request for coolant channels.

2. The additive manufacturing method of claim 1, further including machining the one or more sheets of material with a plurality of tools of the manufacturing system.

3. The additive manufacturing method of claim 1, further including displaying one or more prompts for at least one of: defining the layers or adding the joint structure.

4. The additive manufacturing method of claim 3, further including displaying one or more prompts for specifying a characteristic of the one or more sheets of material.

5. The additive manufacturing method of claim 4, wherein the characteristic includes a dimension of the one or more sheets of material.

6. The additive manufacturing method of claim 1, further including displaying one or more prompts for specifying a wall thickness or a layer thickness.

7. The additive manufacturing method of claim 1, further including automatically nesting the segments in the one or more sheets of material.

8. The additive manufacturing method of claim 1, further including presenting one or more prompts for selecting a tool from a plurality of tools of the manufacturing system.

9. The additive manufacturing method of claim 1, wherein a joint is formed between two or more of the plurality of segments by removing material in response to instructions generated with the control system.

10. The additive manufacturing method of claim 9, wherein a shape of the joint is automatically generated with the control system.

* * * * *